United States Patent
Tomic et al.

(10) Patent No.: US 7,774,321 B2
(45) Date of Patent: Aug. 10, 2010

(54) PARTIAL XML VALIDATION

(75) Inventors: Dragan Tomic, Redmond, WA (US);
Shankar Pal, Redmond, WA (US);
Gideon Schaller, Killara (AU); Istvan Cseri, Redmond, WA (US); Wei Yu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 11/268,090

(22) Filed: Nov. 7, 2005

(65) Prior Publication Data

US 2007/0112851 A1    May 17, 2007

(51) Int. Cl.
G06F 7/00 (2006.01)
G06F 17/00 (2006.01)

(52) U.S. Cl. ........................ 707/690; 707/803
(58) Field of Classification Search ........... 707/200, 707/204, 687, 690, 790, 802, 803
See application file for complete search history.

(56) References Cited

U.S. PATENT DOCUMENTS

| | | | |
|---|---|---|---|
| 6,654,734 B1 | 11/2003 | Mani et al. | 707/2 |
| 7,031,956 B1 * | 4/2006 | Lee et al. | 707/3 |
| 7,210,097 B1 * | 4/2007 | Clarke et al. | 715/227 |
| 2003/0154444 A1 * | 8/2003 | Tozawa et al. | 715/513 |
| 2004/0002939 A1 | 1/2004 | Arora et al. | 707/1 |
| 2004/0006744 A1 * | 1/2004 | Jones et al. | 715/514 |
| 2004/0073870 A1 | 4/2004 | Fuh et al. | 715/513 |
| 2004/0098269 A1 | 5/2004 | Wise et al. | 705/1 |
| 2004/0255116 A1 | 12/2004 | Hane et al. | 713/161 |
| 2005/0038816 A1 | 2/2005 | Easton | 707/104.1 |

(Continued)

FOREIGN PATENT DOCUMENTS

EP        1 376 386 A2    1/2004

(Continued)

OTHER PUBLICATIONS

Bouchou, B. et al., "Extending Tree Automata to Model XML Validation Under Element and Attribute Constraints", http://www.blois.univ-tours.fr/~bouchou/Publis/bdhl-ICEIS2003.pdf, 7 pages.

(Continued)

Primary Examiner—James Trujillo
Assistant Examiner—Marc Somers
(74) Attorney, Agent, or Firm—Woodcock Washburn LLP (57) ABSTRACT

Modifying a portion of an XML document stored in a relational database includes converting operations on the document into an operator tree. The operator tree includes a first operator corresponding to a first portion of the schema for the modified data and a second operator corresponding to a parent portion of the schema for the modified data. A first and a second portion of the schema are extracted from the overall document schema. A first validation of the modified data using the first operator with the first portion of the schema is performed. This forms a partially validated XML document portion. Next, a second validation of the partially validated XML document portion with the second portion of the schema is performed using the second operator. The XML document constraints are verified and the modified data is merged into the XML document, thus avoiding a full validation of the XML document when certain XML Schema types are absent in the modified data.

20 Claims, 9 Drawing Sheets

U.S. PATENT DOCUMENTS

| | | | |
|---|---|---|---|
| 2005/0039166 A1 | 2/2005 | Betts et al. | 717/114 |
| 2005/0071344 A1 | 3/2005 | Chen et al. | 707/100 |
| 2005/0177543 A1 | 8/2005 | Chen et al. | 707/1 |
| 2005/0187973 A1* | 8/2005 | Brychell et al. | 707/104.1 |
| 2005/0210002 A1* | 9/2005 | Pal et al. | 707/3 |
| 2006/0004729 A1* | 1/2006 | Zhilyaev et al. | 707/3 |

FOREIGN PATENT DOCUMENTS

| | | |
|---|---|---|
| WO | WO 2004/036417 A2 | 4/2004 |
| WO | WO 2005/013131 A2 | 2/2005 |

OTHER PUBLICATIONS

Bouchou, B. et al., "Updates and Incremental Validation of XML Documents", *Lecture Notes in Computer Science*, Feb. 2004, 2921, 216-235, http://www.springerlink.com/app/home, 2 pages, Abstract Only.

Papakonstattinou, Y. et al., "Incremental Validation of XML Documents", http://www.mpi-sb.mpg.de/units/ag5/teaching/ss03/xml-seminar/Material/papakonstantinou_icdt2003.pdf, 7 pages.

Riggs, S., "Data Quality and XML Validation", http://www.idealliance.org/papers/dx_xmle03/papers/03-02-06/03-02-06.pdf, Abstract Only.

\* cited by examiner

| Primary Key | XML Customer Column Data |
|---|---|
| 1 | `<customer CID="123">`<br>　　`<billing address>`<br>　　　　`<street>` Any Street `</street>`<br>　　　　`<zip code>` 98052 `</zip code>`<br>　　`</billing address>`<br>`</customer>` |
| 2 | `<customer CID="456">`<br>　　`< billing address>`<br>　　　　`<street>` Billing Street 2`</street>`<br>　　　　`<zip code>` 98052 `</zip code>`<br>　　`</billing address>`<br>　　`<shipping address>`<br>　　　　`<street>` Shipping Street 2`</street>`<br>　　　　`<zip code>` 98052 `</zip code>`<br>　　`</shipping address>`<br>`</customer>` |

PARTIAL XML VALIDATION

CROSS REFERENCE TO RELATED APPLICATIONS

This application contains subject matter in common with the following co-owned patent applications which are hereby incorporated by reference in their entirety: U.S. Patent Publication No. 2006/0085489 corresponding to U.S. patent application Ser. No. 11/185,310 filed on Jul. 20, 2005 entitled Memory Cache Management in XML/Relational Data; and U.S. Patent Publication No. 2005/0210002 corresponding to U.S. patent application Ser. No. 10/803,283 filed on Mar. 18, 2004 entitled System And Method For Compiling An Extensible Markup Language Based Query.

BACKGROUND

The XML (eXtended Markup Language) provides a standard way of tagging data so that the data can be read and interpreted in a variety of ways such as by Web browsers. XML documents are used extensively in daily transactions. An XML Schema is a W3C (World Wide Web Consortium) standard that defines a schema definition language for an XML data model. Schema definitions can be used to validate the content and the structure of XML instance documents.

Normally, an XML Schema is used to define the data format used in an XML document. If an XML document is to be updated, the updated information must conform to the constraints placed on the document by the associated schema. The XML Schema document is an XML document that is expressed in a different way than the tables and columns of a relational database system. The type information supplied in an XML Schema document can also be used to check XML queries for correctness, and optimize XML queries and XML storage. Thus, verification that the data to be placed into the XML document meets the schema constrains is an important consideration. In some instances, XML documents can be large. An example could be a customer list where a large number of customers are listed along with their customer numbers and one or more addresses and other relevant customer information. This information may be useful to transfer from one location to another via an XML format, but it is also useful to edit or use the information via a relational database. The XML data stored in the relational database may be stored as a binary large object (BLOB). Thus, if updates to the customer list were needed, then the structure of the stored data in the relational database storage must also match the schema.

Having the capability to store XML Schema documents in relational structures has at least the following advantages. The type definitions can be searched efficiently using relational index structures instead of parsing the XML Schema documents. Appropriate pieces of the XML schema documents (e.g., CustomerType definition) can be selectively loaded into memory buffers for validations of XML instances, which provide a significant performance improvement. And SQL (Structured Query Language) views can be provided on the relational storage for relational users to know about stored XML Schema documents. But, the techniques for manipulating data between SQL and XML are limited and some exact a heavy toll on SQL performance because of the verification of the entire XML document when an update to only a portion of the document is being made.

SUMMARY

Modifying only a portion of an XML document stored in a relational database usually incurs the cost of an entire XML document validation. The present invention provides a technique to perform only a partial validation. The partial validation is performed on the data to be modified in the XML document and not the entire document. The method includes converting the document validation into an operator tree. The operator tree includes a first operator corresponding to a first portion for the validation of the modified data according to the XML schema and a second operator corresponding to the validation of the parent portion of the modified data according to the XML schema. A first and a second portion of the schema are extracted from the overall document schema. A first validation, a deep validation, of the modified data using the first operator with the first portion of the schema is performed. Next, a second validation, a shallow validation, of the results of the first validation with the second portion of the schema is performed using the second operator. The XML document constraints are verified and the modified data is merged into the XML document, thus avoiding a full validation of the XML document.

DETAILED DESCRIPTION OF ILLUSTRATIVE EMBODIMENTS

Exemplary Embodiments

In one aspect of the invention, a method is disclosed that provides an improved caching of metadata tables for translation of XML Schema data into a relational database structure. In one SQL implementation, when a typed XML Column is modified via the modify method there is validation taking place to ensure the conformity of the new value. This validation is part of the query execution and therefore it is vital that its effect on performance is minimal. Traditionally applications that allow modification of a typed XML document will validate the whole document at the end of the DML (Data Modification Language) operation. In some SQL based machines, this can result in a dramatic performance hit since an XML document can be very large (up to 2 GB). To mitigate the performance degradation, an algorithm and an operator can be used that will ensure, at query execution time, an XML data validation examines the absolutely minimal XML sub-tree, and still maintain the integrity of the XML document as a whole.

As an example, consider a list of customers in an XML format as follows:

```
<listOfCustomers>
   <customer CID="123">
      <billingAddress>
         <street> Any Street </street>
         <zipCode> 98052 </zipCode>
      </billingAddress>
   </customer>
</listOfCustomers>
```

The format of this data may conform to a schema defining the data types used in the list. There are constraints used in the schema to define each field of data within the XML data content. If an additional address were to be added, the additional address data must also conform to the schema defining the data of the XML format. An added address, for example a shipping address entry may be represented in XML as follows:

```
<list of customers>
   <customer CID="123">
      < billing address>
         <street> Billing Street </street>
         <zip code> 98052 </zip code>
      </billing address>
      <shippingAddress>
         <street> Shipping Street </street>
         <zip code> 98052 </zip code>
      </shippingAddress>
   </customer>
</list of customers>
```

The above example XML is for a customer identifier (CID) of "123". But there could be thousands of such entries. If placed in a relational database, the re-validation required for just one address entry may force the re-validation of all entries of all customers in the database. An advantage would be to avoid re-validating all multiple thousands of elements. In general, it should be enough to make sure that the particular added new shipping address element is valid by ensuring that the schema allows the addition of a shipping address element in its content and that this shipping address element is of the correct structure.

In order to ensure the condition above it is sufficient in this example to look at the siblings of the "shippingAddress" element and its parent (the "customer" element). If the query execution machinery can flow only the records representing the parent of the inserted element and its siblings, without their content, and the validation operator is knowledgeable of what is being validated, then one approach is to execute the minimal number of operations that will ensure the validity of the whole document without re-validating the whole document. In this particular scenario, during query execution, the validation operator will process couple of tens of rows and not the, potentially, thousands of rows if it had to validate the whole document.

Figure 1:
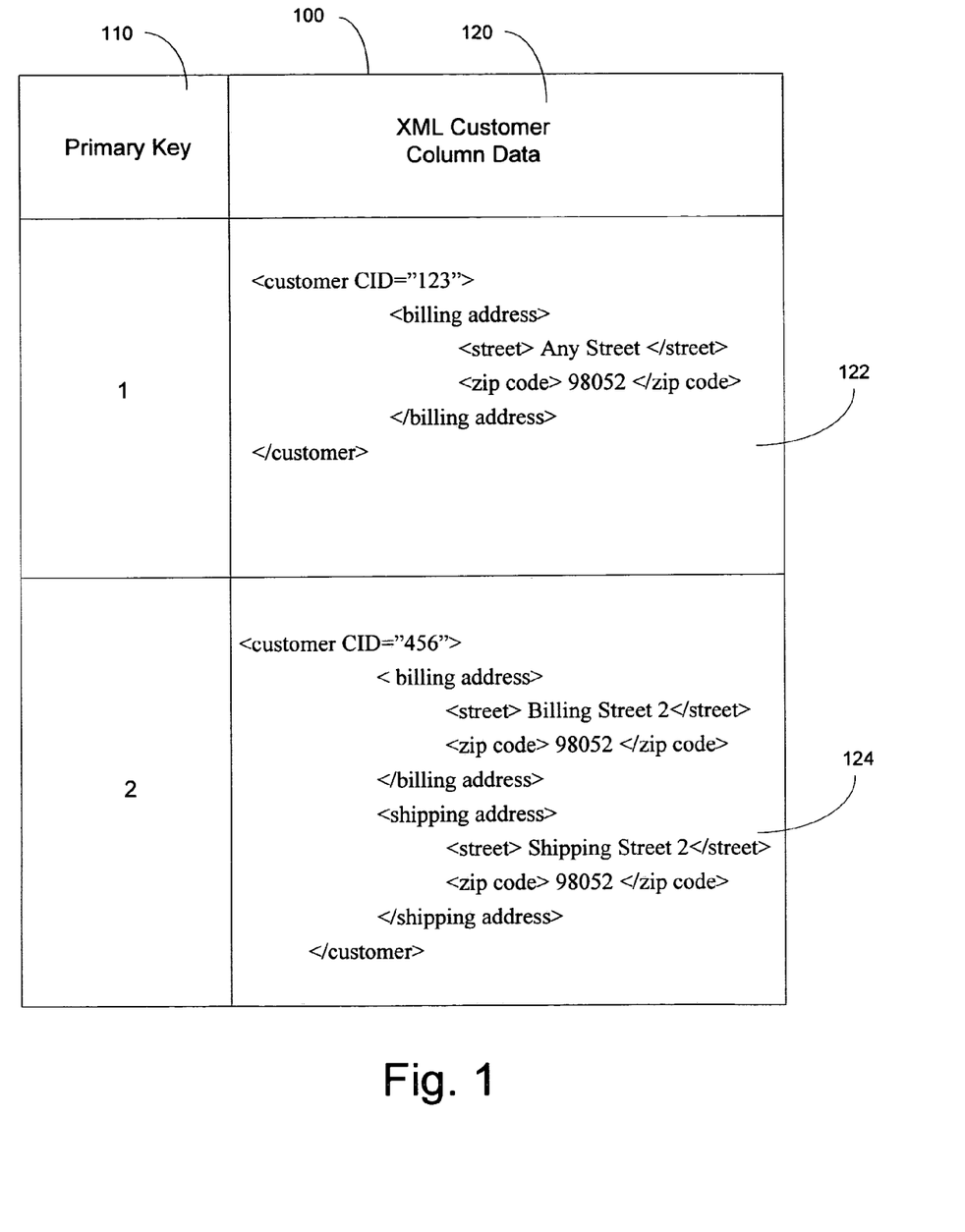
FIG. 1 is a depiction of an example format of XML data in a relational database according to an aspect of the invention.

In one embodiment of the invention, XML query processing may involve storing the XML data in its own format as a BLOB (Binary Large Object) in a relational database as shown in FIG. 1. The XML data may be placed into relational form by either an on demand shredding of the data into a rowset of a pre defined shape, or by accessing an XML Index which is already a rowset of pre shredded XML data. FIG. 1 depicts a table 100 having two columns; a primary key column 110 and a data column 120. In this example, the BLOB data represented in the data column for customer ID 123 contains only a billing address at 122. The data column BLOB for customer ID 456 however contains both a billing and a shipping address at 124. If additional information for customer ID 123 is desired, such as new shipping address data, the BLOB will have to be updated, but the XML document will also have to be updated in conformance with its schema. Ordinarily, this would involve a verification of the XML data for the entire document. But this is not desirable when the document is very large. In one aspect of the invention, a full document validation may be avoided if only a portion of the relevant XML schema is used.

Figure 2:
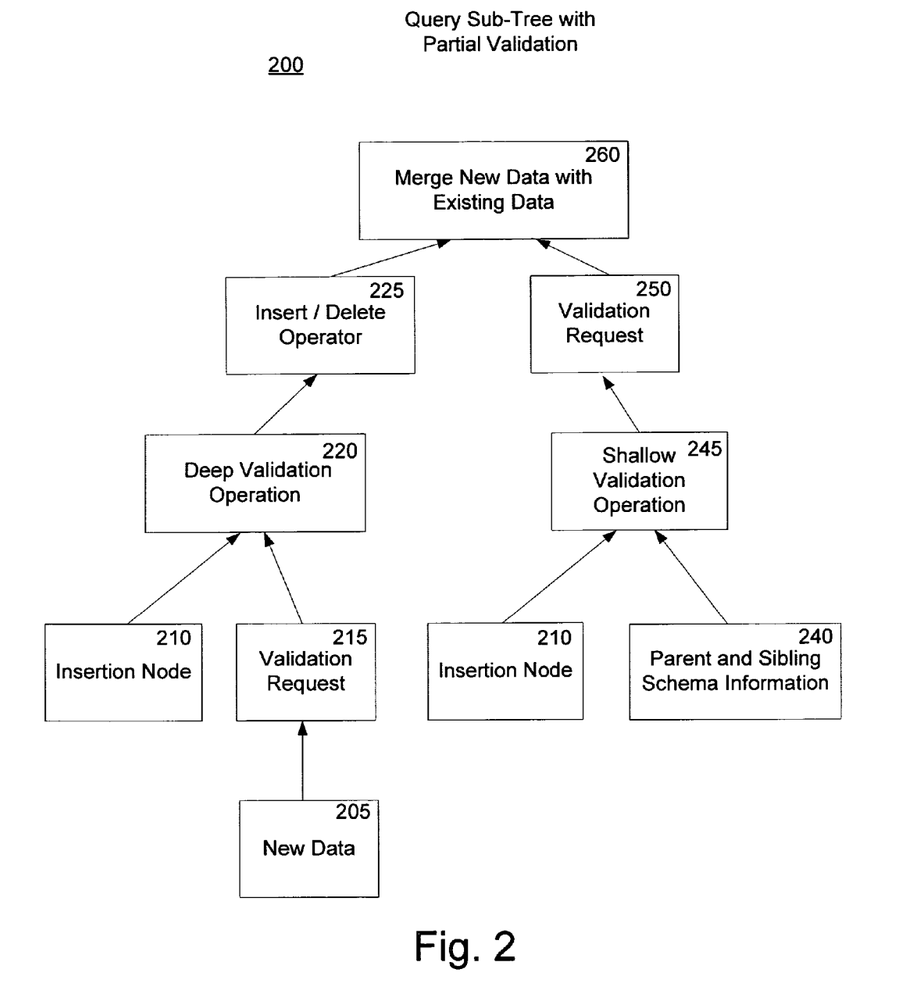
FIG. 2 is a functional diagram depicting the operator tree for partial validation according to an aspect of the invention.

FIG. 2 is a flow diagram of a query sub tree describing the execution of an XML insertion or deletion data operation, with partial validation. The FIG. 2 query subtree depicts operations which flow up to the entry of new information into the XML Blob stored in the relational database.

Referring to FIG. 2, in a query sub-tree with partial validation 200, new data (i.e. a new XML entity) to be entered, such as a shipping address of customer ID 123, is acquired 205 and a validation request is made 215. The data to be validated and the insertion node information 210 are necessary to perform a deep validation operation 220. Deep validation is a recursive operation that will validate the complete logical XML Entity 205. In the example, the deep validation uses information from selected schema constraints applicable to the tag of <shippingAddress>, applies them to the specific data of the new XML entity, and validates that the deep constraints of the schema are met by the new XML data. An insert operator 225 may then be used to pre-insert the new information into a form which may be used by the relational database.

A shallow validation operation 245 requires both the insertion node information 210 as well as parent node of the new XML entity and schema information 240. Here, the minimal XML data needed for validating the content of the sub tree being modified is used. To obtain this limited schema information, the extraction of the relevant schema information is needed. This extraction is further explained below. But, in brief, the query engine will fetch only the rows representing the parent of the elements being inserted or deleted and its siblings, and will flow it through the request for shallow validation 250. The query execution machinery of an XML processor is augmented with XML specific operators. Deep validation is done by a special purpose validator. In one embodiment, this validator may be composed of a single state machine which will not recurse into complex content and will ignore all simple data types. Once deep validation is performed at the output of 225 and a shallow validation is performed at the output of 250, then the new data may be merged with the existing data 260. A validation operator can perform XML validation on relational input representing the XML data. Executing the deep validation ensures the validity of the new data. Shallow validation of the parent of the new data guarantees that the integrity of the document is maintained.

Once both are complete then a partial validation is performed. Partial validation allows the entry of new data without performing a full document validation which can be time-intensive.

Partial XML validation works for most of the XML Schema constructs. But, some XML Schema constraints, such as ID/IDREF and key/keyref, have the entire XML instance as their scope. As such, validation of the modified data or its parent portion is inadequate. The occurrence of these XML Schema constraints in the modified data may cause the entire XML document to be validated. For example, ID is an XML Schema feature that allows associating an identifier with an element using an xs:ID type attribute or element. IDREF is a reference to one such ID. In one aspect of the invention, ID is unique within a single XML instance (or document or BLOB). Thus, if <shippingAddress> were to contain an ID attribute, the ID value is maintained to be unique within the XML instance. Similarly, if <shippingAddress> were to specify an IDREF, then the schema validation must ensure that the target (ID) of the IDREF exists in the same XML instance. IDREFS is a sequence of IDREF. Neither IDREF nor IDREFS should contain dangling references, that is, refer to non-existent target (ID). "Key" defines key values and "keyref" defines references to the key values. These require ensuring that the key value is unique within an XML instance and the keyref refers to an existing key value. Similarly, a "unique" constraint can be defined for values that should be unique within an XML instance. All these require uniqueness checks within the new XML entity and the existence of the referenced nodes or values.

One aspect of the invention is the use of a procedure to extract the portion of the schema which is needed for partial validation. Co-owned U.S. patent application Ser. No. 11/185,310, corresponding to U.S. Patent Publication No. 2006/0085489, filed on Jul. 20, 2005 entitled Memory Cache Management in XML/Relational Data teaches a method of extracting a relevant portion of schema and is incorporated herein in its entirety. The relevant portions of the schema are stored in a cache.

Specifically, the XML input schema for the XML document is shredded into many relational tables and only the most frequently used pieces of schema can be selectively loaded and cached. Furthermore, since the relational layout includes several primary and secondary indexes, the loading of schemas will also be fast. Because XML schemas are shredded into tables, XML instance validation loads only the necessary components to perform validation. During validation, only parts of the schema that are used are loaded and cached. The schema cache stores the in-memory representation of XML schema optimized for XML instance validation. XML schema components are loaded from metadata into main memory as read-only objects such that multiple users can use the in-memory objects for validation. If the XML schema is changed during the operation, the schema cache entries are invalidated.

Once the required schemas are located in relational tables, the parts relevant to Type, Attribute, or Element definition will be added to the XSD type cache. In implementation, a reverse mechanism from the schema import is used: first, a symbol table is created, and then, validation structures are derived that are cached.

Figure 4:
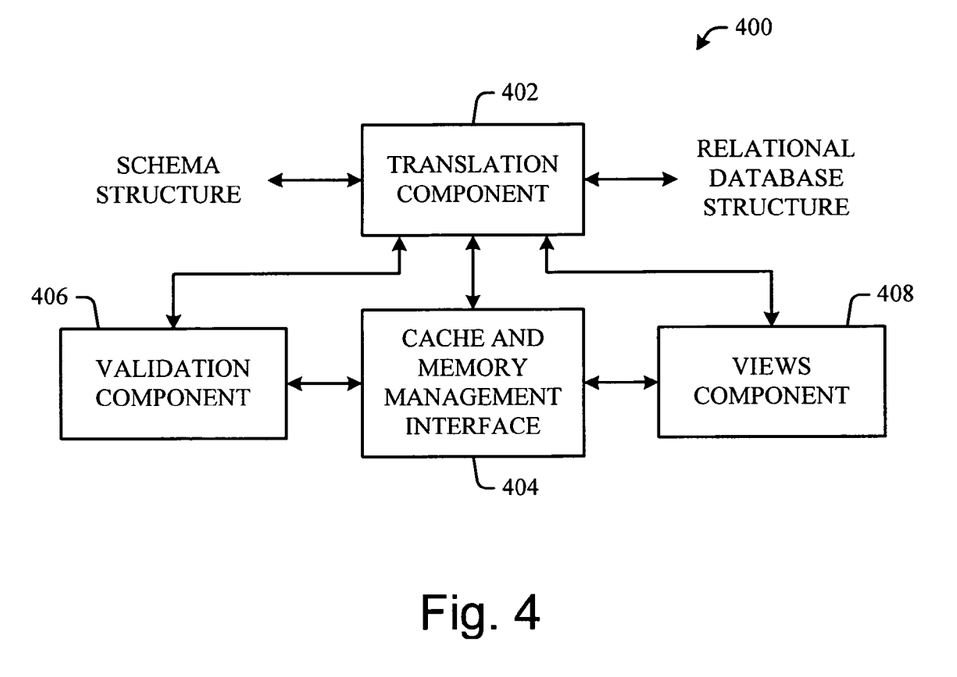
FIG. 4 is a block diagram depicting elements of a system having XML schema document in relational format according an aspect of the invention.

FIG. 4 illustrates a system 400 that facilitates translation with cache and memory management, and internal views thereof. A translation component 402 provides translation capabilities by decomposing a schema structure (e.g., an XML schema) into tables of metadata that can be selectively accessed to facilitate interfacing of XML data to a relational data structure. A user provides data that conforms to the XML schema. The system 400 validates that the user-supplied data actually conforms to the XML schema. In other words, a database engine looks at both the user-supplied data and the schema, and determines how to efficiently validate the data. The data is not being stored in a native or raw binary form. A cache memory and memory management interface (MMI) component 404 facilitates storing the tables of metadata in the cache memory for rapid access of only necessary XML components. A validation component 406 facilitates loading and caching only parts of the schema that are used. A views component 408 allows a user to view the internal metadata tables in a tabular format. Note that although cache and memory management is described in FIG. 4 with respect to an input XML schema to relational mapping, the disclosed caching management architecture is not restricted thereto, but finds application of the translation between any input schema and a relational structure.

Because XML schemas are shredded into tables, XML instance validation loads only the necessary components to perform validation. During validation, only parts of the schema that are used are loaded and cached. The Schema Cache stores the in-memory representation of XML schema optimized for XML instance validation. XML schema components are loaded from metadata into main memory as read-only objects such that multiple users can use the in-memory objects for validation. If the XML schema is changed during the operation, the schema cache entries are invalidated.

Figure 5:
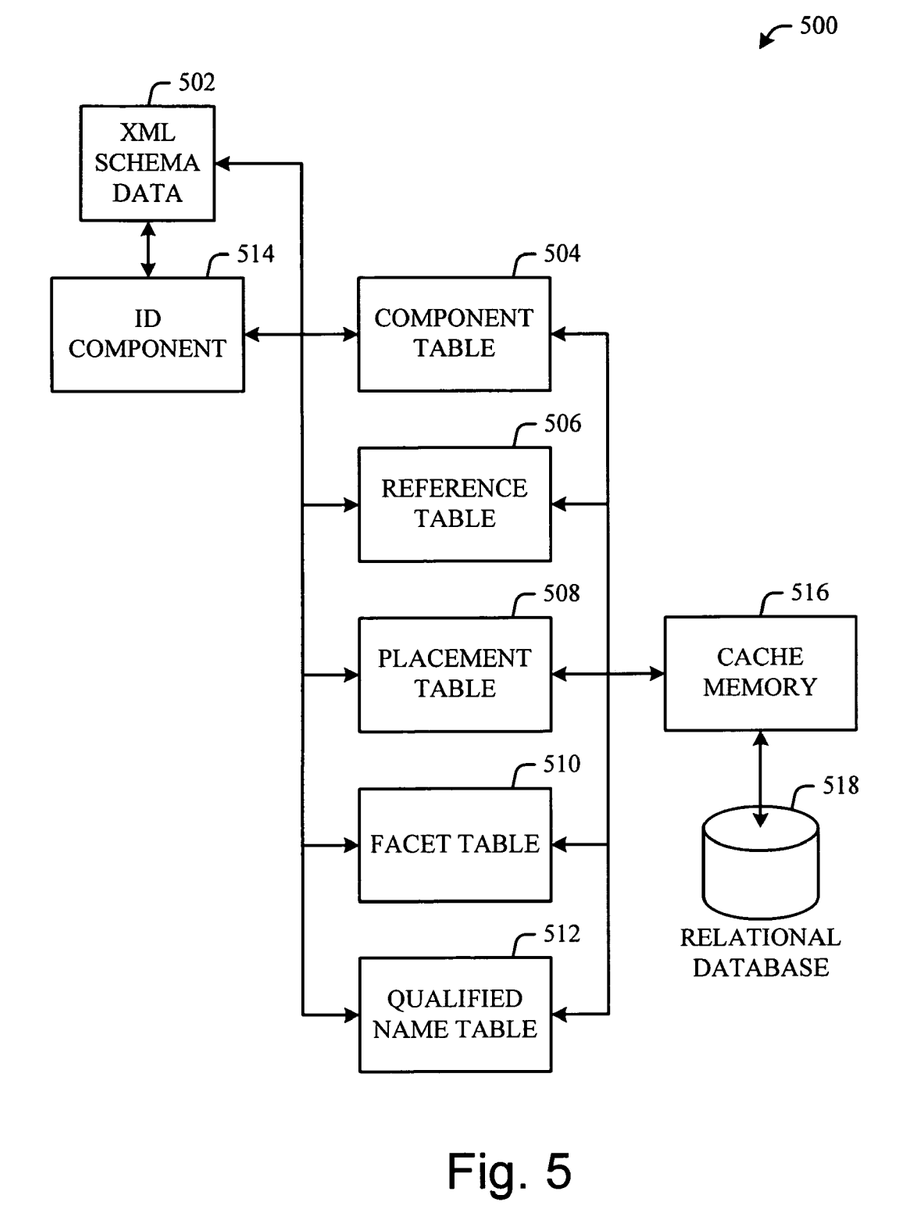
FIG. 5 is a depiction of meta-data tables used to store schema components according to an aspect of the invention.

During the final phase of persisting data, the novel code populates metadata tables that describe the structure of the XML Schema types. FIG. 5 illustrates a system 500 of tables into which XML schema data 502 is shredded. In one implementation, the XML schema data 502 is persisted as metadata in several tables: a component table 504, a reference table 506, a placement table 508, a facet table 510, and a qualified name table 512. An ID component 514 interfaces to the XML Schema data 502 in order to assign an identifier (e.g., a component ID) to each component thereof. A cache memory 516 interfaces to each of the tables (504, 506, 508, 510, and 512) such that the contents of any single table or combination of tables can be accessed and persisted therein to provide improved data access with a relational database 518.

Figure 6:
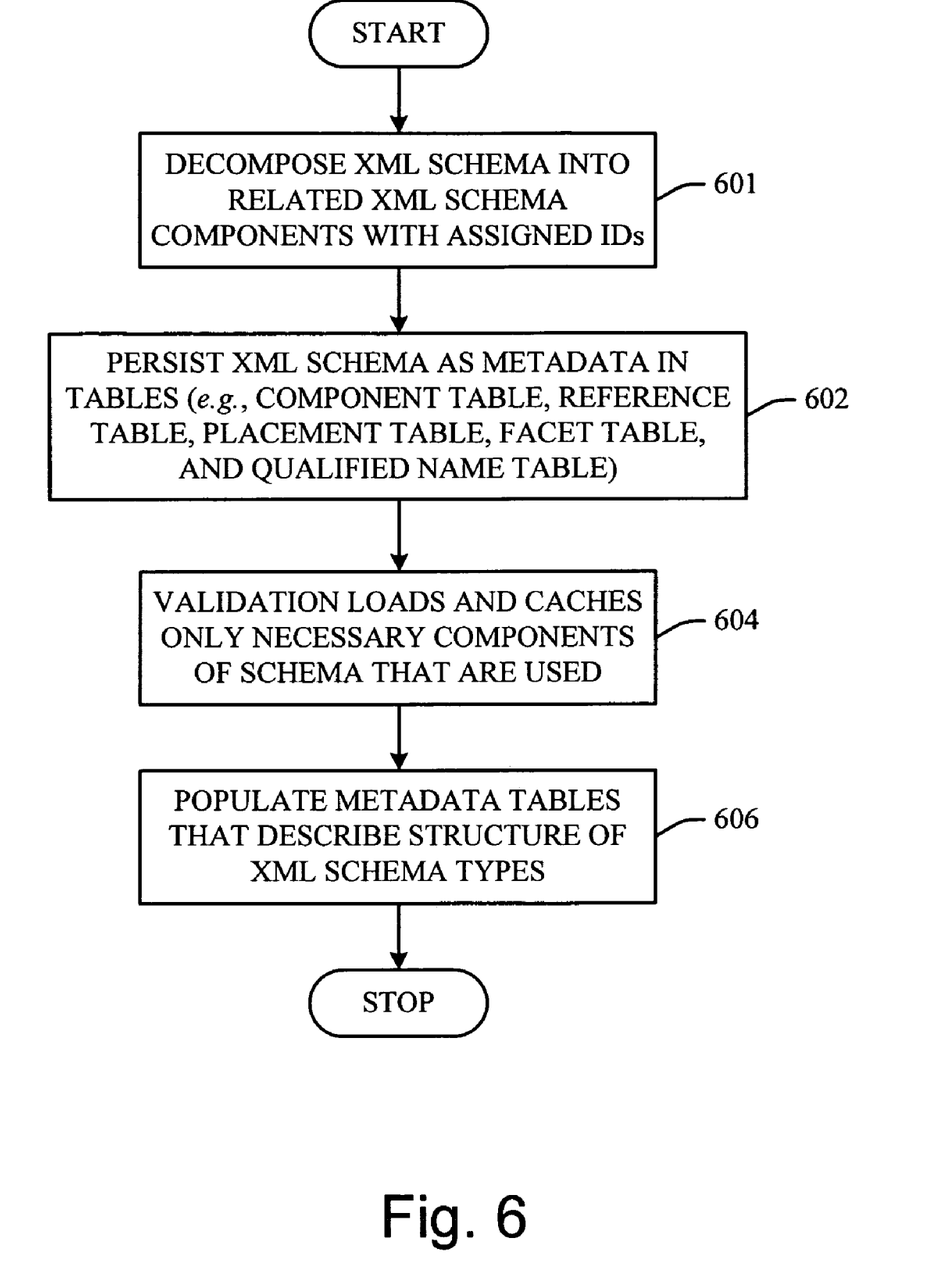
FIG. 6 is an example flow diagram which shows the steps for populating the meta-data tables depicted in FIG. 5 according to aspects of the invention.

Accordingly, FIG. 6 illustrates a methodology 600 of processing XML Schema data into tables. At step 601, the XML Schema data is decomposed into related XML Schema components with assigned IDs. At step 602, the XML schema is persisted as metadata in the tables. At step 604, the validation process loads and caches only necessary schema components that are to be used. At step 606, the tables are populated with data that describes the structure of the XML schema types.

In one aspect of the invention, nodes are identified in an XML document. The identification of nodes enables the translation of queries and data modifications on an XML document into an operator tree and the subsequent insertion of node specific information in the process of deep and shallow validation. Co-owned U.S. patent application Ser. No. 10/803,283, corresponding to U.S. Patent Publication No. 2005/01210002, filed on Mar. 18, 2004 entitled System And Method For Compiling An Extensible Markup Language Based Query teaches a method of converting queries and data modifications on XML data into an operator tree for execution by a query processor and is incorporated by reference herein in its entirety.

Figure 3:
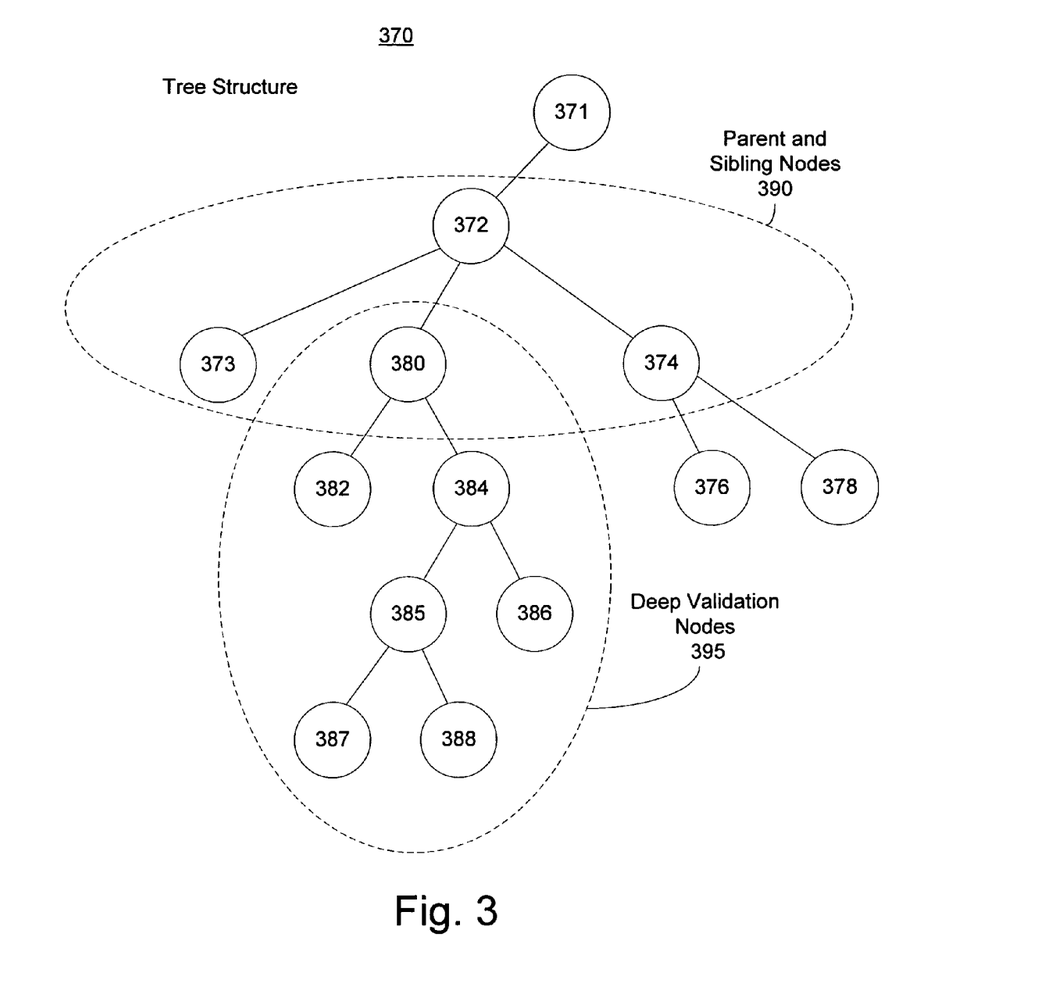
FIG. 3 is a depiction of an example XML document tree structure according to an aspect of the invention.

One aspect of the invention includes the translation of an XML document into a tree structure. Such a structure is shown in FIG. 3. Translation of an XML structure into a tree will be further discussed below. The tree structure 370 mirrors that of an XML document where tags, data and constraints are reflected in the node structure. In the FIG. 3 structure, parent and sibling nodes are shown at 390 and deep validation nodes are shown at 395. The topmost node 371 has a subnode 372 that is parent node for nodes 373, 380, and 374. Node 374 is a parent node for nodes 376 and 378. Node 380 is a parent node for nodes 382 and 384. Node 384 is a parent for nodes 385 and 386 and node 385 is parent for nodes 387 and 388. In an aspect of the invention, if node 380 is not present in the tree structure, but it is desirable to add it in, then the structure and constraints of an XML schema which defines the XML document must be observed. A node structure can be generated for an XML document when the XML document is compiled.

In brief, the method for compiling an XML based query includes receiving an XML expression by a database engine front end. The query is parsed by a relational query parser and embedded XML expressions are forwarded to an XML parser. The XML expression is parsed by the XML parser to yield an abstract syntax tree. The abstract syntax tree is then forwarded to an XML operation generator, which transforms the abstract syntax tree into a unified tree including XML algebra operations. The unified tree is then forwarded to an XML algebrizer, which converts the unified tree into a relational tree including enhanced relational algebra operations. The relational tree is grafted into a log-op tree being produced for the enclosed relational query. The log-op tree results in a query plan that is forwarded to a query processor for optimization and execution of the query at the query processor.

Figure 7:
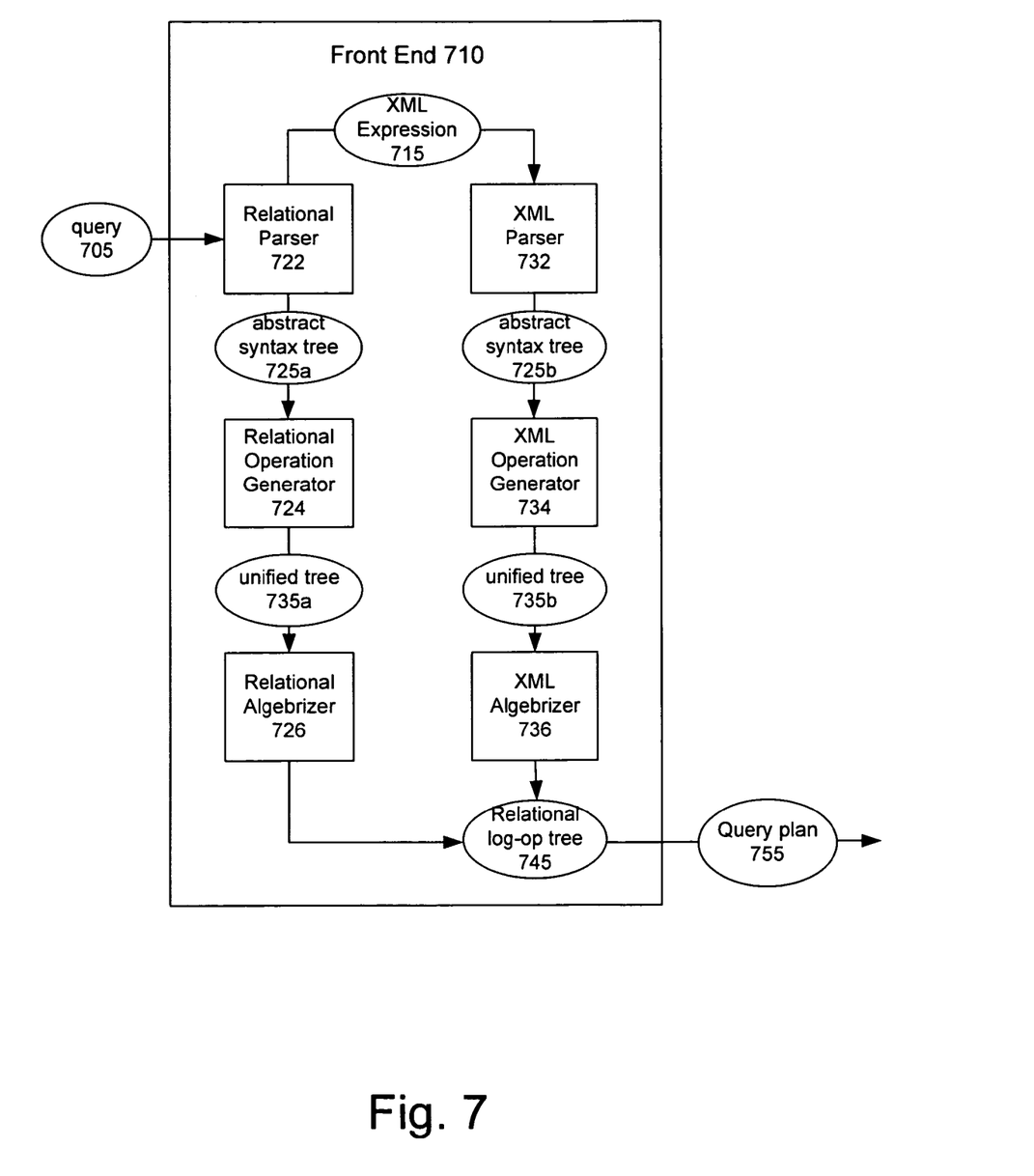
FIG. 7 is a functional diagram showing compilation of a query or data modification statement on XML data producing an enhanced relational operator tree according to an aspect of the invention.

Referring now to FIG. 7, query 705 including XML expression 715 may be received and manipulated by front end 710 to generate a query plan 755 for executing query 705. In addition to parsing query 705 to yield a relational abstract syntax tree 725a, relational parser 722 passes XML expression 715 from query 705 to XML parser 732. XML parser 732 then parses XML expression 715 to generate an XML abstract syntax tree 725b.

XML Algebrizer 736 converts the XML operations within unified tree structure 735b into a relational log-op tree 745 that includes enhanced relational operations. XML Algebrizer 736 recursively traverses unified tree 735b. For each node of unified tree 735b, a corresponding relational sub-tree is generated via 724 and 735a. Each such relational sub-tree includes a number of enhanced relational algebra operations required to perform the XML algebra operation in its associated unified tree node. The relational sub-trees via 726 are then inserted into relational tree 745. XML operation generator 734 transforms the XML abstract syntax tree 725b into an XML unified tree structure 735b including XML algebra operations.

XML Algebrizer 736 converts the XML operations within unified tree structure 735b into a relational log-op tree 745. Conventional relational algebra operations are inadequate to describe XML operations which access hierarchical data. Accordingly, XML algebrization in accordance with the present invention converts XML operations into enhanced relational algebra operations. The relational log-op tree 745 may then become the basis for a query plan 755.

Figure 8:
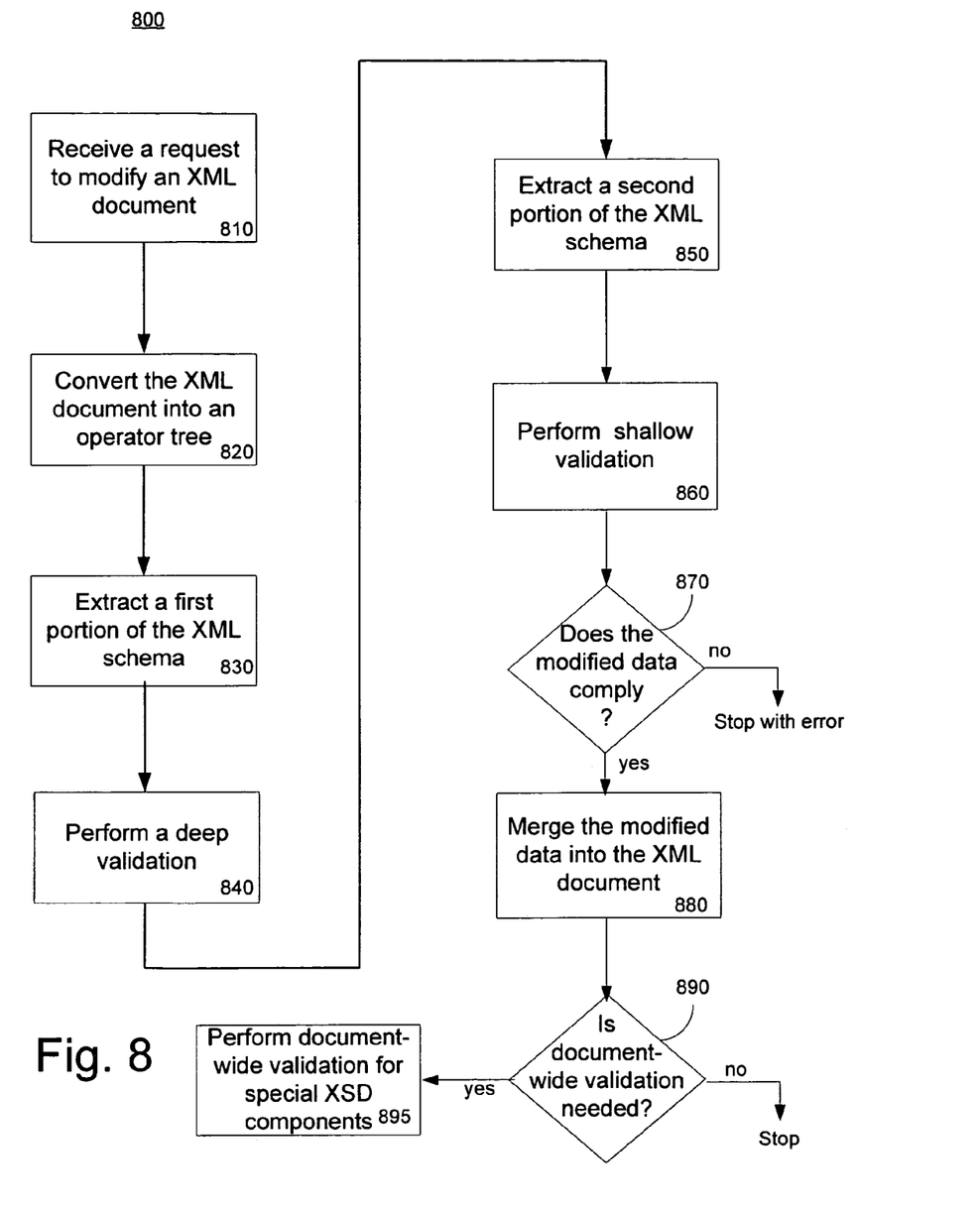
FIG. 8 is an example flow diagram of performing a partial validation of an XML document according to aspects of the invention.

FIG. 8 depicts a flow diagram for an example method 800 having aspects of the invention. Initially, a computing device including a query processor receives a request to modify an XML document (step 810). The modification to the XML document may be an addition, a deletion or a change of data in the XML document. The XML document is normally governed by an XML schema which defines the format and data content constraints for data in the document. In one aspect of the invention, the XML data is stored in a relational format (i.e. a relational database format), yet, any valid change to the XML document conforms to the constraints of the XML schema for the document.

Either previously, or as part of the method 800, the XML document is converted to an operator tree structure (step 820). The conversion of an operator tree structure involves parsing the XML document into an abstract syntax tree, transforming the abstract syntax tree into a unified tree, and converting the unified tree into the operator tree structure.

The modified XML data can be validated only by comparing the data and its attributes, sometimes stored in metadata, to the specific portion of the schema associated with the desired location in the XML document. Thus, a first portion of the XML schema is extracted (step 830). This first portion is associated with the data to be modified. A deep validation may be performed (step 840). A deep validation is a validation of the inserted data. The deep validation checks the modified part against the format and constraints of the first portion of the XML data. A deep validation involves recursively validating a complete logical entity of the modified data. Thus, the deep validation may take the modified data entity by entity (e.g. word by word or number by number) and validate the data against the extracted first portion of the XML schema. Once the deep validation is completed, a partial validation is complete. The partial validation being a validation of only the modified data against the first portion of the XML schema.

But, parent constraints may also place limitations on the validity of the data to be modified. These parent constraints are embodied in the parent portion of XML schema which is associated with the first portion of the XML schema. Thus, a second portion of the XML schema is extracted (step 850). This second portion is the parent portion of the XML schema. Extracting a portion of an XML document schema involves decomposing the XML schema into tables of schema components and storing the tables in a cache. The tables may be stored in a relational format.

A shallow validation is performed (step 860). A shallow validation completes the validation process by comparing the partial validation results against the second portion of the schema. The second portion of the schema represents the parent data constraints the schema places on the modified data. Although the partial validation results may indicate that the modified data format and content are correct for the first portion of the schema (deep validation), the shallow validation checks that the modification comports with the higher level constraints of the second, parent schema information. For example, the shallow validation can confirm that the parent schema information allows the number of occurrences, type and format of the modified data.

If the shallow validation does not comport with the parent schema constraints (step 870) then the method terminates as rejecting the modified data. If the modified data does comport with the first and second extracted XML schemas, then the modified part of the document may be merged into the full XML document (step 880). Note that this merger may be the modification of the XML data that is stored in relational format. In an alternate embodiment, extracting the second portion of the XML Schema (step 850) may be combined with extracting the first portion of the XML schema (step 830) if a priori knowledge of the identity of the second potion of the XML schema is known at step 830.

In some instances, the method 800 may complete at step 880. In other instances, such as where there is an instance of ID/IDREF or key/keyref, a wider validation may be needed (step 890). If there is no additional reference in the modified part, then the process stops. If there are additional constraints on the modified part, then a document-wide validation for special XSD components is performed (step 895).

Exemplary Computing Device

Figure 9:
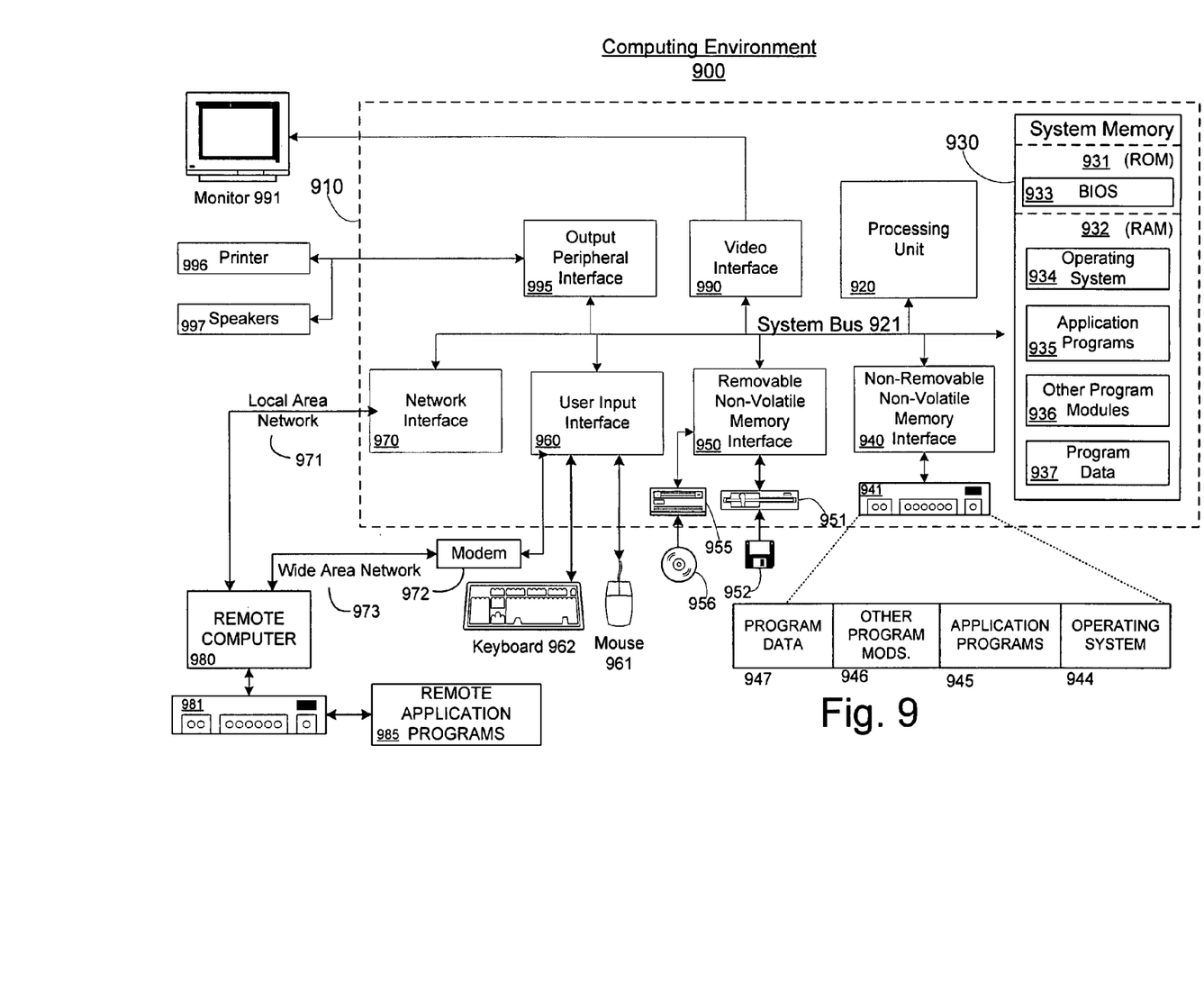
FIG. 9 is an example computing environment in which aspects of the invention may be practiced.

FIG. 9 and the following discussion are intended to provide a brief general description of a suitable computing environment 900 in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 9, an exemplary system for implementing an embodiment of the invention includes a general purpose computing device in the form of a computer system 910. Components of computer system 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 910 typically includes a variety of computer readable media. Computer readable media can be any available media that can be accessed by computer system 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer system 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer system 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9 provide storage of computer readable instructions, data structures, program modules and other data for the computer system 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer system 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 921 via an interface, such as a video interface 990, which may in turn communicate with video memory (not shown). In addition to monitor 991, computer systems may also include other peripheral output devices such as speakers 997 and printer 996, which may be connected through an output peripheral interface 995.

The computer system 910 may operate in a networked or distributed environment using logical connections to one or more remote computers, such as a remote computer 980. The remote computer 980 may be a personal computer, a server, a router, a network PC, a peer device or other common network node, and typically includes many or all of the elements described above relative to the computer system 910, although only a memory storage device 981 has been illustrated in FIG. 9. The logical connections depicted in FIG. 9 include a local area network (LAN) 971 and a wide area network (WAN) 973, but may also include other networks/buses. Such networking environments are commonplace in homes, offices, enterprise-wide computer networks, intranets and the Internet.

When used in a LAN networking environment, the computer system 910 is connected to the LAN 971 through a network interface or adapter 970. When used in a WAN networking environment, the computer system 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer system 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement an XML partial validation scheme. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to perform a partial XML validation of an XML document, the method comprising:

receiving a user request to modify data of an XML document, the XML document stored as a large binary object in a relational database, the XML document retrieved from the relational database, the XML document defined by an XML document schema comprising a first portion and a second portion, wherein the data to be modified is constrained by the first portion of the XML document schema, and wherein the second portion of the XML document schema comprises a parent portion of the first portion, wherein the parent portion comprises constraints on the first portion;

converting the XML document associated with the request into an operator tree structure for execution by a query processor, the operator tree having a first operator corresponding to the first portion of the XML document schema and a second operator corresponding to the parent portion of the XML document schema;

extracting the first portion of the XML document schema;

performing a partial validation of the modified data using the first operator with the extracted first portion of the XML document schema to form a partially validated XML document portion;

extracting the second portion of the XML document schema;

performing a validation of the partially validated XML document portion with the extracted second portion of the XML document schema using the second operator to verify that the partially validated XML document portion complies with constraints of the extracted second portion of the XML document schema;

merging the modified data into the XML document, wherein a full validation of the XML document is avoided;

displaying the XML document on a monitor; and returning the XML document to the relational database.

2. The method of claim 1, wherein converting the XML document into an operator tree structure for execution by a query processor comprises:

parsing the XML document to yield an abstract syntax tree;

transforming the abstract syntax tree into a unified tree; and converting the unified tree into the operator tree structure.

3. The method of claim 1, wherein extracting a first portion and a second portion of the XML document schema comprises:

decomposing the XML document schema into tables of schema components; and storing the first portion of the XML document schema into a cache memory.

4. The method of claim 1, wherein performing a partial validation of the modified data using the first operator with the extracted first portion of the XML document schema to form a partially validated XML document portion comprises performing a deep validation of the modified data wherein the modified data is checked against constraints of the extracted first portion of the XML document schema.

5. The method of claim 4, wherein performing a deep validation comprises recursively validating a complete logical entity of the modified data.

6. The method of claim 1, wherein performing a validation of the partially validated XML document portion with the extracted second portion of the XML document schema using the second operator comprises performing a shallow validation of the partially validated XML document.

7. The method of claim 6, wherein performing a shallow validation of the partially validated XML document comprises performing a validation using the parent node information of the second operator.

8. The method of claim 1, wherein merging the modified data into the XML document, wherein a full validation of the XML document is avoided comprises merging the modified data into the XML document and avoiding a full validation if none of an ID/IDREF, a key/keyref and a unique constraint are present in the modified data.

9. A processor for modifying data in an XML document stored in a relational form, the processor configured to:

receive a user request to modify data of an XML document, the XML document stored as a large binary object in a relational database, the XML document retrieved from the relational database, the XML document defined by an XML document schema comprising a first portion and a second portion, wherein the data to be modified is constrained by the first portion of the XML document schema, and wherein the second portion of the XML document schema comprises a parent portion of the first portion, wherein the parent portion comprises constraints on the first portion;

convert the XML document associated with the request into an operator tree structure, the operator tree having a first operator corresponding to the first portion of the XML document schema and a second operator corresponding to the parent portion of the XML document schema;

extract the first portion of the XML document schema;

perform a partial validation of the modified data using the first operator with the extracted first portion of the XML document schema to form a partially validated XML document portion;

extract the second portion of the XML document schema;

perform a validation of the partially validated XML document portion with the extracted second portion of the XML document schema using the second operator to verify that the partially validated XML document portion complies with constraints of the extracted second portion of the XML document schema;

merge the modified data into the XML document, wherein a full validation of the XML document is avoided;

display the XML document on a monitor;

and return the XML document to the relational database.

10. The processor of claim 9, wherein the processor converts the XML document into an operator tree structure by:

parsing the XML document to yield an abstract syntax tree;

transforming the abstract syntax tree into a unified tree; and converting the unified tree into the operator tree structure.

11. The processor of claim 9, wherein the processor extracts the first portion and the second portion of the XML document schema by:

decomposing the XML document schema into tables of schema components; and storing the first portion of the XML document schema into a cache memory.

12. The processor of claim 9, wherein the processor performs the partial validation of the modified data using the first operator with the extracted first portion of the XML document schema to form a partially validated XML document portion by performing a deep validation of the modified data wherein the modified data is checked against constraints of the extracted first portion of the XML document schema.

13. A computer-readable storage medium having computer-executable instructions for performing a method of validating a modified XML document stored in relational form, the method comprising:

receiving a user request to modify data of an XML document, the XML document stored as a large binary object in a relational database, the XML document retrieved from the relational database, the XML document defined by an XML document schema comprising a first portion and a second portion, wherein the data to be modified is constrained by the first portion of the XML document schema, wherein the second portion of the XML document schema comprises a parent portion of the first portion, wherein the parent portion comprises constraints on the first portion;

converting the XML document associated with the request into an operator tree structure for execution by a query processor, the operator tree having a first operator corresponding to the first portion of the XML document schema and a second operator corresponding to the parent portion of the XML document schema;

extracting the first portion and second portion of the XML document schema;

performing a partial validation of the modified data using the first operator with the extracted first portion of the XML document schema to form a partially validated XML document portion;

performing a validation of the partially validated XML document portion with the extracted second portion of the XML document schema using the second operator to verify that the partially validated XML document portion complies with constraints of the second portion of the XML document schema;

merging the modified data into the XML document, wherein a full validation of the XML document is avoided; and returning the XML document to the relational database.

14. The computer-readable storage medium of claim 13, wherein the step of converting the XML document into an operator tree structure for execution by a query processor comprises:

parsing the XML document to yield an abstract syntax tree;
transforming the abstract syntax tree into a unified tree; and
converting the unified tree into the operator tree structure.

15. The computer-readable storage medium of claim 13, wherein the step of extracting a first portion and a second portion of the XML document schema comprises:

decomposing the XML document schema into tables of schema components; and
storing in a cache memory the first portion of the XML document schema and the second portion of the XML document schema in a relational format.

16. The computer-readable storage medium of claim 13, wherein the step of performing a validation of the modified data using the first operator with the first portion of the XML document schema to form a first partially validated XML document portion comprises performing a deep validation of the modified data wherein the modified data is checked against constraints of the first portion of the XML document schema.

17. The computer-readable storage medium of claim 16, wherein the step of converting performing a deep validation comprises recursively validating a complete logical entity of the modified data.

18. The computer-readable storage medium of claim 13, wherein the step of performing a validation of the partially validated XML document portion with the second portion of the XML document schema using the second operator comprises performing a shallow validation of partially validated XML document.

19. The computer-readable storage medium of claim 18, wherein the step of performing a shallow validation of the partially validated XML document comprises performing a validation using the parent node information of the second operator.

20. The computer-readable storage medium of claim 13, wherein the step of merging the modified data into the XML document, wherein a full validation of the XML document is avoided comprises merging the modified data into the XML document and avoiding a full validation if none of an ID/IDREF, a key/keyref, and a unique constraint are present in the modified data.

\* \* \* \* \*